US007265766B2

(12) United States Patent
Kempf

(10) Patent No.: US 7,265,766 B2
(45) Date of Patent: Sep. 4, 2007

(54) METHOD AND SYSTEM FOR ADAPTIVE BIT DEPTH ENHANCEMENT FOR DISPLAYS

(75) Inventor: Jeffrey M. Kempf, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 602 days.

(21) Appl. No.: 10/739,972

(22) Filed: Dec. 17, 2003

(65) Prior Publication Data

US 2005/0134612 A1 Jun. 23, 2005

(51) Int. Cl.

| | |
|---|---|
| ***G09G 5/00*** | (2006.01) |
| ***G06T 17/00*** | (2006.01) |
| ***G06K 9/36*** | (2006.01) |
| ***G06K 9/40*** | (2006.01) |
| *G06K 9/46* | (2006.01) |
| *G06T 15/50* | (2006.01) |

(52) U.S. Cl. ...................... 345/690; 345/428; 345/586; 345/600; 345/643; 382/247; 382/254; 382/260; 382/266

(58) Field of Classification Search ................ 345/426, 345/428, 581, 589–593, 600, 605–610, 612, 345/618, 596, 643, 639–640, 690, 692; 348/474, 348/519, 602–607, 615, 683, 628–629; 382/247, 382/253, 254, 260, 266, 274, 282
See application file for complete search history.

(56) References Cited

U.S. PATENT DOCUMENTS

| | | | | |
|---|---|---|---|---|
| 5,038,216 | A * | 8/1991 | Easterly et al. | 348/364 |
| 2001/0031097 | A1* | 10/2001 | Mancuso et al. | 382/264 |
| 2003/0098925 | A1* | 5/2003 | Orlick | 348/448 |
| 2005/0280662 | A1* | 12/2005 | Tognoni et al. | 345/690 |

* cited by examiner

*Primary Examiner*—Wesner Sajous
(74) *Attorney, Agent, or Firm*—Charles A. Brill; Wade James Brady, III; Frederick J. Telecky, Jr.

(57) ABSTRACT

According to one embodiment, a method for compensating for inadequate bit resolution in a light processing system includes receiving a plurality of values each indicative of an intensity level for a pixel to be displayed. Each of the values is represented by a plurality of bits of data. The method also includes determining a quantization step size for the plurality of bits of data. For at least one particular pixel of the pixels, a set of consecutive pixels including the particular pixel is selected. The method also includes determining a difference between the value associated with the particular pixel in the set and each value associated with the other pixels in the set, and also determining that all of the determined differences are less than or equal to the quantization step size. In response, a filtered value for the particular pixel in the set is generated based at least on some of the pixels in the set in addition to the particular pixel.

22 Claims, 4 Drawing Sheets

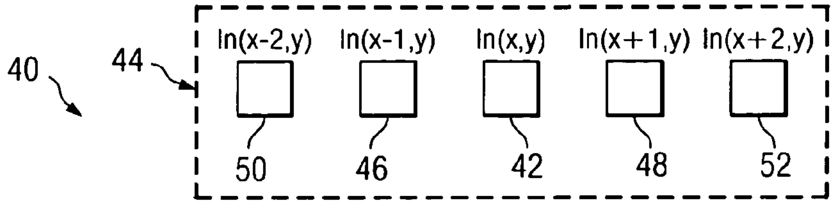

*FIG. 3A*

54
```
HORIZONTAL VARIANCE 1 = h1 = ABSOLUTE (In(x,y) - In(x-2,y))
HORIZONTAL VARIANCE 2 = h2 = ABSOLUTE (In(x,y) - In(x-1,y))
HORIZONTAL VARIANCE 3 = h3 = ABSOLUTE (In(x,y) - In(x+1,y))
HORIZONTAL VARIANCE 4 = h4 = ABSOLUTE (In(x,y) - In(x+2,y))
```

56
```
If (h1<=q(x,y)) AND (h2<=q(x,y)) AND (h3<=q(x,y)) AND (h4<=q(x,y))
  H(x,y) = ( In(x-2,y) + 2*In(x-1,y) + 2*In(x,y) + 2*In(x+1,y) + In(x+2,y)) / 8
Else
  H(x,y) = In(x,y)
End
```

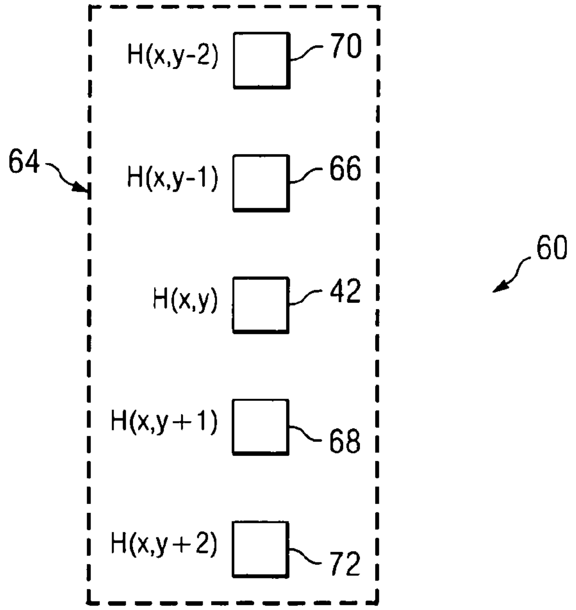

*FIG. 3B*

74
```
VERTICAL VARIANCE 1 = v1 = ABSOLUTE (H(x,y) - H(x,y-2))
VERTICAL VARIANCE 2 = v2 = ABSOLUTE (H(x,y) - H(x,y-1))
VERTICAL VARIANCE 3 = v3 = ABSOLUTE (H(x,y) - H(x,y+1))
VERTICAL VARIANCE 4 = v4 = ABSOLUTE (H(x,y) - H(x,y+2))
```

76
```
If (v1<=q(x,y)) AND (v2<=q(x,y)) AND (v3<=q(x,y)) AND (v4<=q(x,y))
  Out(x,y) = (H(x,y-2) + 2*H(x,y-1) + 2*H(x,y) + 2*H(x,y+1) + H(x,y+2))/8
Else
  Out(x,y) = H(x,y)
End
```

METHOD AND SYSTEM FOR ADAPTIVE BIT DEPTH ENHANCEMENT FOR DISPLAYS

TECHNICAL FIELD OF THE INVENTION

This invention relates generally to visual displays and more particularly to a method and system for adaptive bit depth enhancement for displays.

BACKGROUND OF THE INVENTION

Television displays and other types of displays often receive a data stream that is decoded by a decoder. For cost reasons, such decoders often possess inadequate resolution for high resolution displays. For example, eight bit decoders may be utilized where twelve or fourteen bit decoders would be more desirable.

This problem of inadequate bit resolution is exacerbated by other processing steps used in digital light processing systems. For example, to account for the non-linear response of a cathode ray tube, television signal images traditionally have a non-linear transfer function applied, and the non-linear response is provided as the input signal. This non-linear function is referred to as a gamma correction curve. In linear devices such as Digital Light Processing (DLP) Systems available from Texas Instruments, however, a de-gamma function must be applied to the incoming pixel stream to correct the unneeded gamma correction. The de-gamma function requires high input and output precision to prevent contouring. Contouring is a quantization artifact that appears as discreet jumps in smoothly varying images.

Other processing steps further exacerbate the problem of inadequate bit resolution. For example, a dynamic aperture approach has been suggested to reduce dither noise in DLP systems. With dynamic aperture, dark scenes are detected, lamp light output is reduced using an aperture, and incoming data is gained according to the amount of lamp light attenuation. The dynamic aperture approach dynamically adjusts the precision of the DLP System. More precision is added for dark scenes, where dither noises are more perceptible than for bright scenes. The dynamic aperture approach also dynamically adjusts the contrast of the projector. When the lamp light output is reduced, the black level is also decreased. This increase in DMD™ precision and projector contrast further exacerbates contours resulting in inadequate input bit precision.

SUMMARY OF THE INVENTION

According to one embodiment, a method for compensating for inadequate bit resolution in a light processing system includes receiving a plurality of values each indicative of an intensity level for a pixel to be displayed. Each of the values is represented by a plurality of bits of data. The method also includes determining a quantization step size for the plurality of bits of data. For at least one particular pixel of the pixels a set of consecutive pixels including the particular pixel is selected. The method further includes determining a difference between the value associated with the particular pixel in the set and each value associated with the other pixels in the set, and also determining that all of the determined differences are less than or equal to the quantization step size. In response, a filtered value for the particular pixel in the set is generated based at least on some of the pixels in the set in addition to the particular pixel.

Some embodiments of the invention provide numerous technical advantages. Some embodiments may benefit from some, none, or all of these advantages. For example, in one embodiment of the invention, false contours may be mitigated and background splotchiness smoothed out through the use of a relatively inexpensive filter. Thus, better quality images may be displayed without the use of more expensive and sophisticated front end decoders. Further, by avoiding the use of more sophisticated and expensive front end decoders, fewer input pins are required to manage the increased input resolution. Thus, image contouring may be addressed without replacing integrated circuits or impacting input/output operations of application specific integrated circuits by instead addressing the contouring problem through signal processing.

Other advantages are readily apparent to those of skill in the art.

BRIEF DESCRIPTION OF THE DRAWINGS

For a more complete understanding of embodiments of the invention, reference is now made to the following description, taken in conjunction with the accompanying drawings, in which:

FIG. 3A is a schematic diagram illustrating a plurality of horizontal pixels;

FIG. 3B is a schematic diagram illustrating a plurality of vertical pixels;

DETAILED DESCRIPTION OF THE INVENTION

Embodiments of the invention and its advantages are best understood by referring to FIGS. 1 through 5C of the drawings, like numerals being used for like and corresponding parts of the various drawings.

Figure 1:
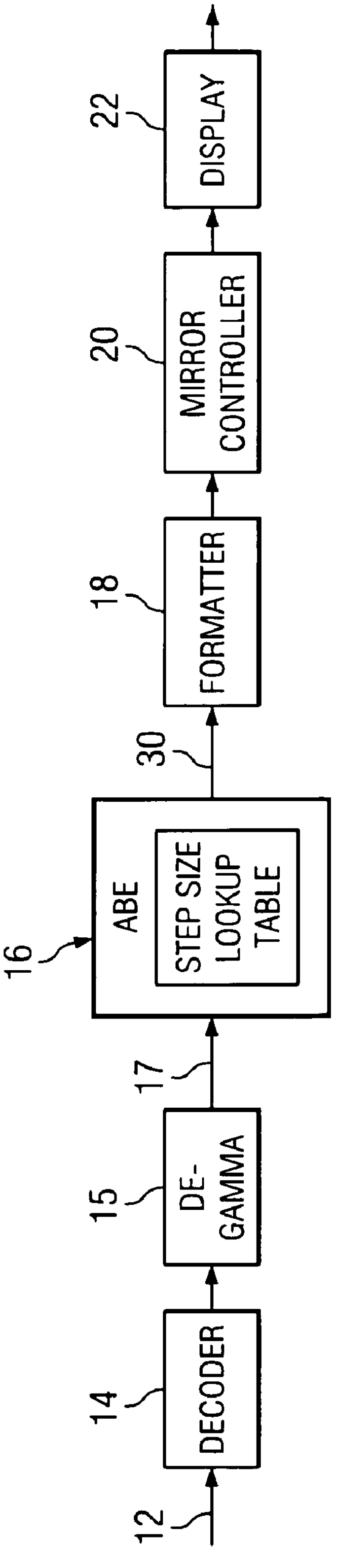
FIG. 1 is a block diagram showing portions of a light processing system according to the teachings of the invention.

FIG. 1 is a block diagram of a light processing system 10 according to the teachings of the invention. System 10 receives a data source 12, such as a television feed. Source 12 may be received by a decoder 14, which decodes the analog source signal and generates a plurality of digital bits. Conventionally a plurality of bits are utilized to represent a value corresponding to an intensity level for a particular pixel to be displayed. As described above, decoders 14 may be of insufficient precision for high resolution displays, particularly in Digital Light Processing (DLP) systems, which utilize a linear display as opposed to the non-linear display of conventional CRTs. Because of the linear display in DLP systems, a de-gamma function is applied to the decoded data received from decoder 14, which as described above, exacerbates the insufficient bit resolution problem. Further, such insufficient bit resolution is also exacerbated if a dynamic aperture approach is utilized.

For linear display systems, de-gamma block 15 is utilized to transform the data source that is decoded by decoder 14 from a non-linear space to linear space. As described above, television data is conventionally conditioned to account for the non-linear response of a CRT image. In cases where CRT image is not utilized, this conditioning needs to be reversed, which is performed by de-gamma block 15.

According to the teachings of the invention, an adaptive bit enhancement filter 16 is utilized to filter data received from decoder 14 such that artificial jumps in data values between adjacent pixels are smoothed, while leaving natural transitions. According to one embodiment of the invention, adaptive bit enhancement filter 16 compares the absolute difference in values between adjacent pixels to a quantization step size of the incoming data stream to determine whether the data values need to be filtered. This comparison is performed in linear space, meaning that the values that are examined correspond linearly with the intensity levels the values represent. The quantization step size provides an indication of the level of precision provided by decoder 14. More particularly, the quantization step size is the ratio between the precision of the logic operating on an incoming signal (ABE 16 and the other downstream components of system 10) and the precision of the associated input decoder (decoder 14 in this example). For example, if the data stream received at ABE 16 will be processed using a 10 bit precision, corresponding to 1024 values, and the analog-to-digital converter has an 8 bit precision corresponding to 256 values, the quantization step size is 4. If it is determined that the data should be filtered, then a new value for each pixel is determined based upon the values of some of its neighbors. According to one embodiment of the invention, this filtering is performed with respect to pixels aligned horizontally and then performed again with respect to pixels aligned vertically. Thus, a given pixel may have a first filtered value generated for it and then replaced with a second generated filtered value. Adaptive bit enhancement filter 16 may be implemented in any suitable form, including an application specific integrated circuit.

The filtered values for the pixels are provided to a formatter 18, which operates to generate bit plane data. This data is then provided to a microcontroller 20 for controlling display on a display 22. Additional details of adaptive bit enhancement block 16 and an associated method are described in greater detail below in conjunction with FIGS. 2 through 5C.

Figure 2:
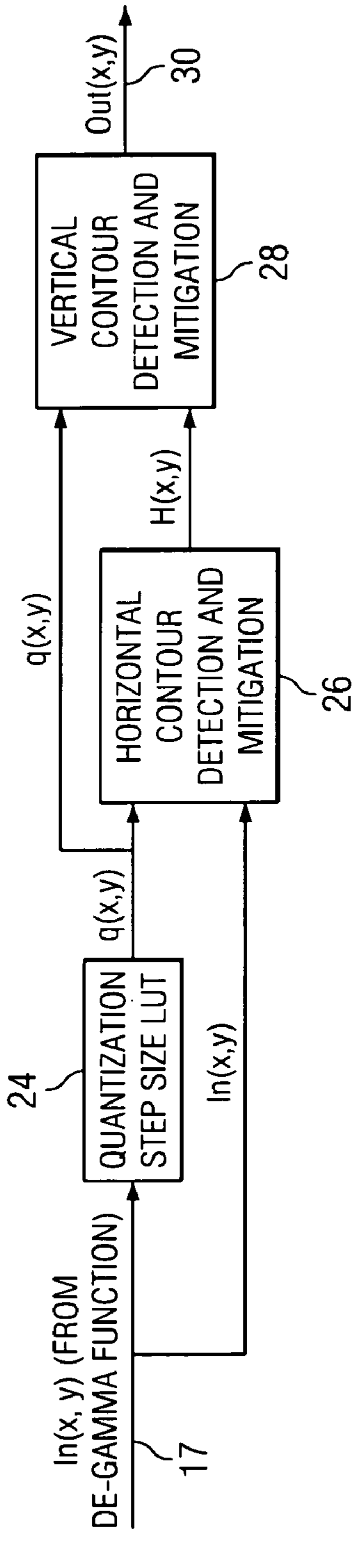
FIG. 2 is a block diagram illustrating a filter according to the teachings of the invention for addressing contouring due to inadequate bit resolution of an incoming data stream.

FIG. 2 is a block diagram of one embodiment of adaptive bit enhancement block 16. Adaptive bit enhancement block 16 includes, in this embodiment, a quantization step size determiner 24, a horizontal filter 26, and a vertical filter 28. The resulting output is provided on line 30. In this example, quantization step size determiner 24 determines the quantization step size of the data received from decoder 14 in linear space. Performing this computation in linear space presents some challenges and, in this example utilizes a lookup table 25 to overcome these challenges, as described in greater detail below. Alternatively, the quantization step size could be determined based upon the data before the de-gamma function is applied in non-linear space. If this is performed, then the decision of whether to filter data, described in greater detail below, is made based on comparisons of data values in non-linear space to the quantization step size in non-linear space and a look-up table is not used.

The input bit precision is found through a characterization of decoder 14. In one example such decoders may include analog-to-digital converters and TV decoders. Because these decoders operate in non-linear space (pre de-gamma) the quantization step size for data transmitted by them is constant over the non-linear gray scale range. However, the quantization step size varies within the linear (post de-gamma) gray scale range. Because adaptive bit enhancement filter 16 operates in linear space, the input bit precision characterization (quantization step size determination) needs to be determined for the linear range. This information is used to populate a quantization step size lookup table 25. The input to lookup table 25 is the current, linear input pixel value and the output of lookup table 25 is the corresponding quantization step size. Table 25 implements a conversion from non-linear space to linear space based on the well-known non-linear response associated with CRTs. Thus, the quantization step size in non-linear space is converted to a quantization step size in linear space by determining the linear difference that matches the non-linear quantization step size difference. If a dynamic aperture technique is utilized, then the pre-gain input pixel value should be used as the input to the quantization step size lookup table 25 and the corresponding quantization step size is adjusted according to the amount of data gained.

In the illustrated embodiment, quantization step size determiner 24 uses lookup table 25 to convert the quantization step size in the non-linear space to the quantization step size in linear space. This quantization step size is then utilized by horizontal filter 26 and vertical filter 28 to appropriately filter data to account for inadequate bit resolution. In general, filters 26 and 28 each locate contours within data by observing the local, spatial variance of the input image. Local variances are calculated by finding the absolute difference among pixels within a five pixel window in this embodiment; however, other numbers of pixels in a window may be utilized. When the local variance is less than or equal to the current quantization step size a spatial filter is employed. By only filtering pixels that cause contouring, high spatial detail is maintained. Thus, natural edges are not blurred.

Figure 4:
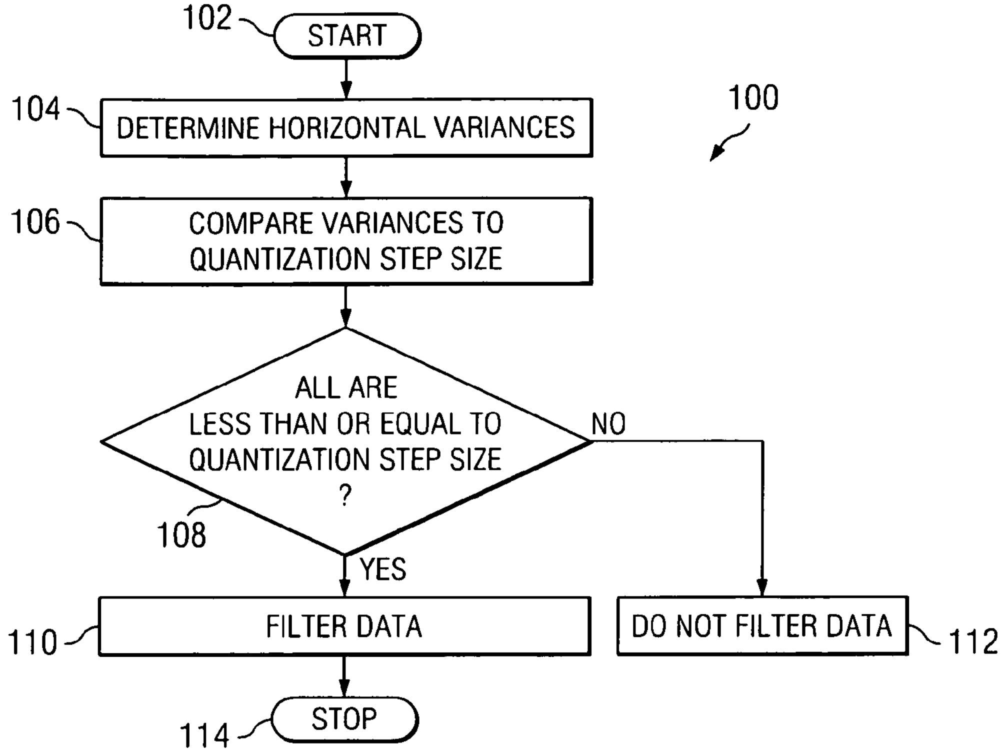
FIG. 4 is a flowchart illustrating one example of the filtering process of an adaptive bit enhancement filter.

FIG. 3A illustrates one example of such a calculation for horizontal filter 26. FIG. 3A illustrates a set of pixels 40 that includes a primary pixel 42 and a plurality of nearby pixels 44. Nearby pixels 44 include pixels 46, 48, 50, and 52. The horizontal variances for primary pixel 42 are determined by comparing values associated with that pixel 42 to each of the other four pixels in the set. Formula 54 illustrates this calculation. The vertical variation is calculated in a similar fashion. With reference to FIG. 3B, pixel 42 is again shown in a different set 60, which includes a plurality of nearby pixels 64, which include pixels 66, 68, 70 and 72. The vertical variance is determined by comparing the values of the primary pixel 42 to the nearby pixels 64. Formula 74 shows these calculations. With reference to FIGS. 2 and 4, the filtering process is described.

FIG. 4 is a flowchart illustrating one example of the filtering process of adaptive bit enhancement filter 16. The method begins at step 102. At a step 104, the horizontal variances between any particular pixel and some of its horizontal neighbors are determined. These variances may be determined as described above in conjunction with FIG. 3A. At step 106, the determined variances are compared to the quantization step size associated with the given pixel. Quantization step size may be determined as described above in conjunction with FIG. 2 or alternatively may be determined by a quantization step size determiner located before the de-gamma function. At step 108 a determination is made of whether all of the determined variances are less than or equal to the quantization step size. If all of the determined variances are not less than or equal to the quantization step size, this indicates the existence of a natural edge, and no filtering is performed, as noted in block 112. If all of the determined variances are less than or equal to the quantization step size, data filtering is performed, as indicated by step 110. Data may be filtered according to the formula 56 of FIG. 3A; however, other suitable filtering formulas may be utilized that result in smoothing of a series of pixels to eliminate contouring. For example, a different number of pixels may be utilized, and different weighting factors for each pixel may be utilized.

It should also be noted that this filtering performed at step 110 is performed in a linear space, meaning that the filtered value corresponds linearly with the intensity level of the associated pixel to be displayed. The method concludes at step 114. Additionally, the same steps may be performed for any given pixel in the vertical direction. Thus, for any given pixel, vertical variances may be determined and compared to the appropriate quantization step size and additional filtering performed. One example formula for performing such filtering is formula 76 of FIG. 3B.

Figure 5A:
FIG. 5A is an image generated utilizing insufficient input resolution.
Figure 5B:
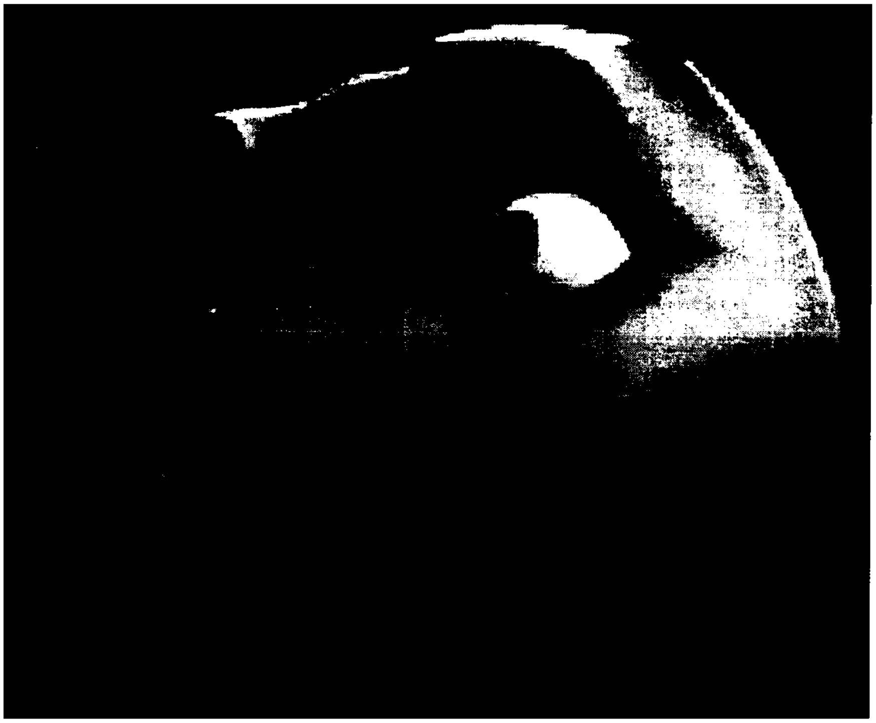
FIG. 5B is the image of FIG. 5A, but after processing according to the teachings of the invention.
Figure 5C:
FIG. 5C is an image generated with sufficient input bit resolution.

FIG. 5A is an image generated utilizing insufficient input bit resolution (six bits), which results in insufficient color resolution. False contours can be seen around the mouth and chin, with splotchiness in the background. FIG. 5B is the same image as FIG. 5A, but after processing according to the teachings of the invention. The false contours are mitigated and the background splotchiness is smoothed. FIG. 5C is an image generated with sufficient input bit resolution (eight bits) for comparison purposes.

Although embodiments of the invention and their advantages are described in detail, a person skilled in the art could make various alterations, additions, and omissions without departing from the spirit and scope of the present invention, as defined by the appended claims.

What is claimed is:

1. A method for compensating for inadequate bit resolution in a light processing system comprising:

receiving a visual image signal comprising a plurality of values each indicative of an intensity level for a pixel to be displayed, each of the values represented by a plurality of bits of data;

determining a quantization step size for the plurality of data, the quantization step size determination performed in a linear domain;

for at least one particular pixel of the pixels:

selecting a set of five consecutive horizontal pixels including the particular pixel in the middle of the set;

determining a horizontal difference between the value associated with the particular pixel in the set and each value associated with the other pixels in the set; and determining whether all of the determined horizontal differences are less than or equal to the quantization step size and, if all the determined differences are less than or equal to the quantization step size, generating a filtered value according to the following formula:

$$\text{filtered value}=[\text{value}(x-2,y)+2^*\text{value}(x-1,y)+2^*\text{value}(x,y)+2^*\text{value}(x+1,y)+\text{value}(x,y)]/8$$

where value (x,y)=the unfiltered value of a pixel having coordinating x,y;

and the coordinates (x,y) are the coordinates of the particular pixel; and for the particular pixel:

selecting a second set of five consecutive vertical pixels including the particular pixel;

determining a vertical difference between the value associated with the particular pixel and the value associated with the other pixels in the second set; and determining whether all the determined differences are less than or equal to the quantization step size and, if all the determined differences are less than or equal to the quantization step size, generating a second filtered value for the particular pixel based on the following formula:

$$\text{second filtered value}=[\text{value}(x,y-2)+2^*\text{value}(x,y-1)+2^*\text{filtered value}(x,y)+2^*\text{value}(x,y+1)+\text{value}(x,y+2)]/8.$$

2. A method for compensating for inadequate bit resolution in a light processing system comprising:

receiving a visual image signal comprising a plurality of values each indicative of an intensity level for a pixel to be displayed, each of the values represented by a plurality of bits of data;

determining a quantization step size for the plurality of bits of data;

for at least one particular pixel of the pixels selecting a set of consecutive pixels including the particular pixel;

determining a respective difference between the value associated with the particular pixel in the set and each respective value associated with the other pixels in the set; and determining that all of the determined respective differences are less than or equal to the quantization step size and in response generating a filtered value for the particular pixel in the set based at least on some of the pixels in the set in addition to the particular pixel.

3. The method of claim 2, further comprising displaying on a display the particular pixel having an intensity level determined by the filtered value.

4. The method of claim 2, wherein selecting a set of consecutive pixels including the particular pixel comprises selecting five consecutive pixels including the particular pixel with the particular pixel disposed in the middle of the five consecutive pixels.

5. The method of claim 2, wherein generating a filtered value for the particular pixel comprises generating a filtered value according to the following formula:

$$\text{filtered value}=[\text{value}(x-2,y)+2^*\text{value}(x-1,y)+2^*\text{value}(x,y)+2^*\text{value}(x+1,y)+\text{value}(x,y)]/8$$

where value(x,y)=the unfiltered value of a pixel having coordinating x,y;

and the coordinates (x,y) are the coordinates of the particular pixel.

6. The method of claim 2, wherein the set of pixels is an odd number of pixels aligned horizontally with the particular pixel being in the middle of the set.

7. The method of claim 2, wherein the set of pixels comprises an odd number of pixels aligned vertically with the particular pixel being in the middle of the set.

8. The method of claim 2, wherein the steps of selecting a set of pixels, determining a respective difference between the value associated with the particular pixel in the set and the each respective value associated with the other pixels in the set, and determining that all the determined differences are less than or equal to the quantization step size and in response generating a filtered value for the particular pixel are steps associated with horizontally aligned pixels, and further comprising additionally performing these acts with respect to a set of vertically aligned pixels.

9. The method of claim 2, wherein the filtered value corresponds linearly with the intensity level of the particular pixel.

10. The method of claim 2, wherein the plurality of values are received from a de-gamma block.

11. The method of claim 2, wherein the quantization step size is determined in linear space.

12. The method of claim 2, wherein the quantization step size is determined in nonlinear space.

13. A system for compensating for inadequate bit resolution in a light processing system comprising:

a decoder for receiving an input signal comprising of a visual image and for generating a plurality of values corresponding to intensity levels for a plurality of pixels to be displayed, the values represented by a plurality of bits of data; and a filter operable to:

receive the plurality of values;

for at least one particular pixel of the pixels:

select a set of consecutive pixels including the pixel;

determine a respective difference between the value associated with the particular pixel in the set and the value associated with each respective other pixel in the set; and determine that all the determined respective differences are less than or equal to a quantization step size for the plurality of bits of data and in response generate a filtered value for the particular pixel based at least on some of the pixels in the set in addition to the particular pixel.

14. The system of claim 13, wherein selecting a set of consecutive pixels including the particular pixel comprises selecting five consecutive pixels with the particular pixel disposed in the middle of the five consecutive pixels.

15. The system of claim 14, wherein generating a filtered value for the pixel comprises generating a filtered value according to the following formula:

$$\text{filtered value}=[\text{value}(x-2,y)+2*\text{value}(x-1,y)+2*\text{value}(x,y)+2*\text{value}(x+1,y)+\text{value}(x,y)]/8$$

where value(x,y)=the unfiltered value of a pixel having coordinating x,y and the coordinates (x,y) are the coordinates of the particular pixel.

16. The system of claim 13, wherein the set of pixels is an odd number of vertically aligned pixels with the particular pixel being in the middle.

17. The system of claim 13, wherein the steps of selecting a set of pixels, determining a respective difference between the value associated with the particular pixel and each respective value associated with the other pixels in the set, and determining that all the determined differences are less than or equal to the quantization step size and in response generating a filtered value for the particular pixel are steps associated with horizontally aligned pixels, and further comprising additionally performing these acts for vertically aligned pixels.

18. The system of claim 13, wherein the filtered value corresponds linearly with the intensity level of the particular pixel.

19. The system of claim 13, wherein determining the quantization step size a quantization step size determined in linear space.

20. The system of claim 13, wherein the filter is implemented in an application specific integrated circuit.

21. The method of claim 1 and further comprising providing a signal representative of the filtered value for the particular pixel for controlling display on a display.

22. The method of claim 2 and further comprising providing a signal representative of the filtered value for the particular pixel for controlling display on a display.

* * * * *